United States Patent [19]
Hartley et al.

[11] Patent Number: 5,361,307
[45] Date of Patent: Nov. 1, 1994

[54] CORRELATION METHODS OF IDENTIFYING DEFECTS IN IMAGING DEVICES

[75] Inventors: Richard I. Hartley, Schenectady; A. Nadeem Ishaque, Clifton Park; Aiman A. Abdel-Malek, Schenectady, all of N.Y.

[73] Assignee: General Electric Company, Schenectady, N.Y.

[21] Appl. No.: 37,191

[22] Filed: Mar. 25, 1993

[51] Int. Cl.$^5$ .............................................. G06K 9/64
[52] U.S. Cl. ........................................ 382/1; 382/42; 382/8
[58] Field of Search ...................... 382/41, 42, 43, 1, 6, 382/8; 364/413.13, 413.12; 356/124, 124.5; 250/201.9; 348/92, 125

[56] References Cited

U.S. PATENT DOCUMENTS

| | | | |
|---|---|---|---|
| 3,278,899 | 10/1966 | Shelton, Jr. et al. | 382/42 |
| 4,228,420 | 10/1980 | Fenimore et al. | 340/146.3 F |
| 4,322,808 | 3/1982 | Weiss | 364/515 |
| 4,360,797 | 11/1982 | Fenimore et al. | 340/146,3 F |
| 4,589,140 | 5/1986 | Bishop et al. | 382/8 |
| 4,794,531 | 12/1988 | Morishita et al. | 364/413.13 |
| 4,924,875 | 5/1990 | Chamoun | 128/696 |
| 4,993,823 | 2/1991 | Schaffer, Jr. et al. | 359/849 |
| 5,007,101 | 4/1991 | Imahashi et al. | 382/42 |
| 5,036,857 | 8/1991 | Semmlow et al. | 128/715 |
| 5,221,834 | 6/1993 | Lisson et al. | 250/201.9 |
| 5,224,176 | 6/1993 | Crain | 382/34 |

Primary Examiner—Michael T. Razavi
Assistant Examiner—Jon Chang
Attorney, Agent, or Firm—Lawrence P. Zale; Marvin Snyder

[57] ABSTRACT

An automated system for determining artifacts in images indicating defects in an imaging device being tested employs a constant radiation source which supplies radiation of spatially uniform intensity to the imaging device to be tested. The imaging device then creates a flood image $A^{(0)}$. A region of interest (ROI) mask means for all pixel values of flood image $A^{(0)}$ sets values to zero outside of the imaging devices field of view to produce a flood image $A^{(1)}$. An image normalization means normalizes flood image $A^{(1)}$ to have an average value of zero producing a normalized flood image A. A correlation means performs an autocorrelation of normalized flood image A to produce a correlation field which is then masked to select portions of the correlation field. The correlation values of the selected regions are summed, the squares of the correlation values are summed and the resulting sums are normalized for mask shape and flood image intensity to determine and quantify the presence of specific artifacts. These normalized summed values may be compared to predetermined thresholds to determine if the artifacts have a magnitude above an acceptable level. Based upon the results of the comparison, a corrective action may be taken such as removing the imaging device from a manufacturing line or adjusting the imaging device and retesting it.

5 Claims, 12 Drawing Sheets

CORRELATION METHODS OF IDENTIFYING DEFECTS IN IMAGING DEVICES

BACKGROUND OF THE INVENTION

1. Field of the Invention

This invention relates to a system for testing imaging devices and more specifically to a system, using correlation techniques for determining defects in imaging devices.

2. Description of Related Art

Because artifacts in an image distort the image, it has become necessary to identify the imaging devices which produce artifacts during their manufacturing, calibration, or field use. These artifacts may be difficult to identify visually and more difficult to identify visually when superimposed upon an image. If the artifacts are not corrected in images, they my be perceived as actual structures in the image. This may be the case in medical imaging where artifacts in the image might be perceived as clinical features in a patient, leading to misdiagnosis. These imaging devices may be medical imaging systems such as Gamma Cameras used in imaging radioactive tracers introduced into a patient's body, X-ray imaging devices, and magnetic resonance (MR)imaging systems.

Prior art methods of detecting defects in Gamma Cameras, for example, are determined by an operator visually examining artifacts in an image produced by a Gamma Camera stimulated by a constant intensity gamma radiation source. This results in a very subjective test that varies greatly from camera to camera.

In Gamma cameras, for example, artifacts may appear as:
1) tubular or hexagonal "hex" patterns showing a distinct evenly spaced dark and light patterns;
2) secondary tube or "hex" patterns, which are differently sized evenly spaced dark and light circular or hexagonal patterns;
3) tramlines, which appear as lines through the image;
4) non-functional tubes, which appear as one or more dark or light regions having little relation to each other
5) bright or dark regions near the edges of the image; and 6) general blotches throughout the image.

Currently, there is a need for a reliable and accurate system to detect and quantify artifacts indicating defects in imaging devices, and adjust the devices to reduce or eliminate the artifacts.

SUMMARY OF THE INVENTION

An automated system for identifying defects in an imaging device employs a uniform energy source for providing energy of spatially uniform intensity to the imaging device allowing the device to create a D-dimensional flood image having a plurality of intensity values over a region of interest (ROI) and also having a background region.

An ROI mask unit sets intensity values of the background region of the flood image to zero.

A normalization unit calculates a mean intensity over the ROI and subtracts the mean intensity from each intensity value within the ROI thereby resulting in normalized intensity values having an average mean intensity of zero over the ROI.

A correlation unit receives the normalized intensity values and determines a D-dimensional correlation field.

A test mask unit selects a test mask, which blocks out non-desired regions of the correlation field and selects desired regions of the correlation field. The correlation values and the squares of the correlation values are summed by a deviation calculation unit.

A mask/exposure compensation unit normalizes the sum of correlation values and the sum of correlation values squared for the shape of the test mask, and the exposure of the flood image.

A decision unit compares the normalized correlation value sum and the normalized sum of the correlation values squared each to a predetermined maximum threshold, and optionally activates a display means, which indicates if either predetermined threshold value has been exceeded indicating that the imaging means has a significant artifact of the type being tested and has failed the test. The result of the test may be used to control adjustment equipment, which may adjust the imaging device and retest it, or activate machinery that may remove the defective imaging device from a manufacturing assembly line.

OBJECTS OF THE INVENTION

It is an object of the present invention to detect defects in images by an automated process having increased reliability and accuracy as compared with existing systems.

It is another object of the invention to detect and quantify different types of artifacts in images by an automated process having increased reliability and accuracy as compared with existing systems.

It is another object of the present invention to detect defects in imaging devices and iteratively adjust and test the imaging device until a predetermined level of quality is achieved.

BRIEF DESCRIPTION OF THE DRAWINGS

The features of the invention believed to be novel are set forth with particularity in the appended claims. The invention itself, however, both as to organization and method of operation, together with further objects, may best be understood by reference to the following description taken in conjunction with the accompanying drawing in which:

FIG. 2b is a correlation field for the flood image of FIG. 2a.

FIG. 3b is a correlation field for the flood image of FIG. 3a.

FIG. 4b is a correlation field for the flood image of FIG. 4a.

FIG. 5b is a correlation field for the flood image of FIG. 5a.

FIG. 6b is a correlation field for the flood image of FIG. 6a.

FIG. 7b is a correlation field for the flood image of FIG. 7a.

FIG. 8b is a correlation field for the flood image of FIG. 8a.

FIG. 9b is a correlation field for the flood image of FIG. 9a.

DETAILED DESCRIPTION OF THE INVENTION

Figure 1:
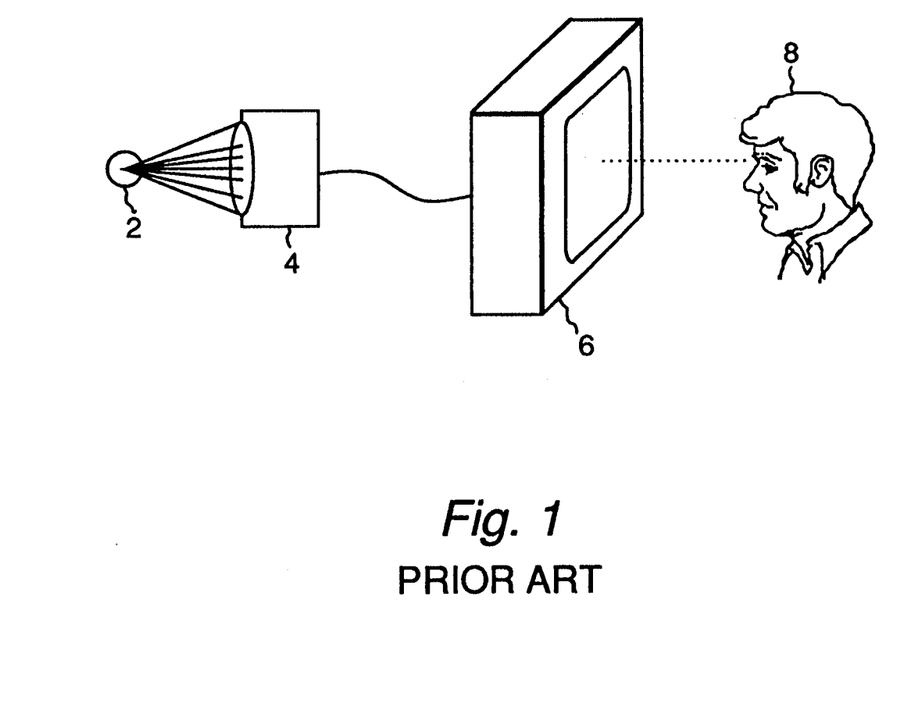
FIG. 1 is a block diagram of prior art system for detecting artifacts in an image created by an imaging system.

FIG. 1 illustrates a prior art setup for determining artifacts in images. A source 2 emits spatially constant radiation which is detected by an imaging device 4. Imaging device 4 constructs a flood image, $A^{(0)}$ having individual intensity values, or pixels which should theoretically have constant intensity over the image except for noise. The flood image is displayed on a monitor 6. An operator 8 examines the flood image on the display to determine if the imaging device should be adjusted, or in the case of manufacturing, be rejected to be remanufactured. The imaging device is then adjusted or re-manufactured and tested again. This process is very time consuming, may become very subjective and may depend upon the fatigue level of the operator.

Figure 2A:
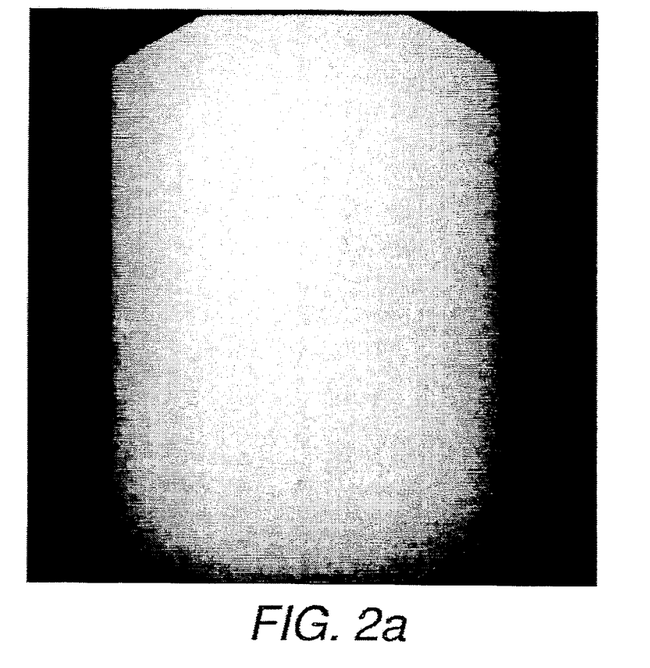
FIG. 2a is a flood image of a spatially constant source having no artifacts except for random noise.
Figure 2B:
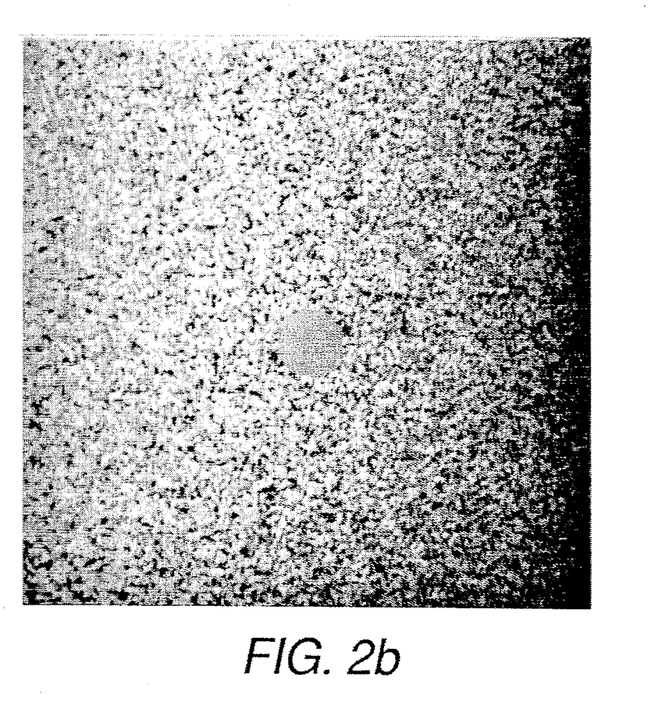
Figure 9A:
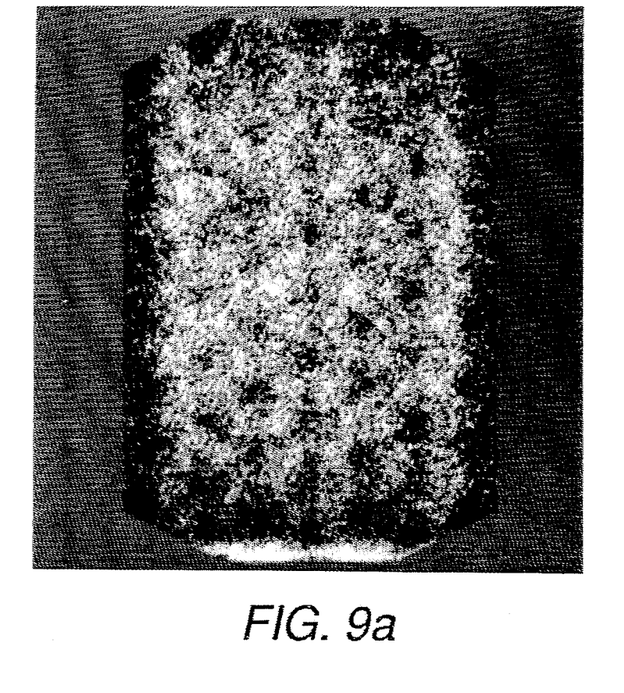
FIG. 9a is a flood image of a spatially constant source having beth tube pattern and tramline artifacts along with random noise.
Figure 9B:
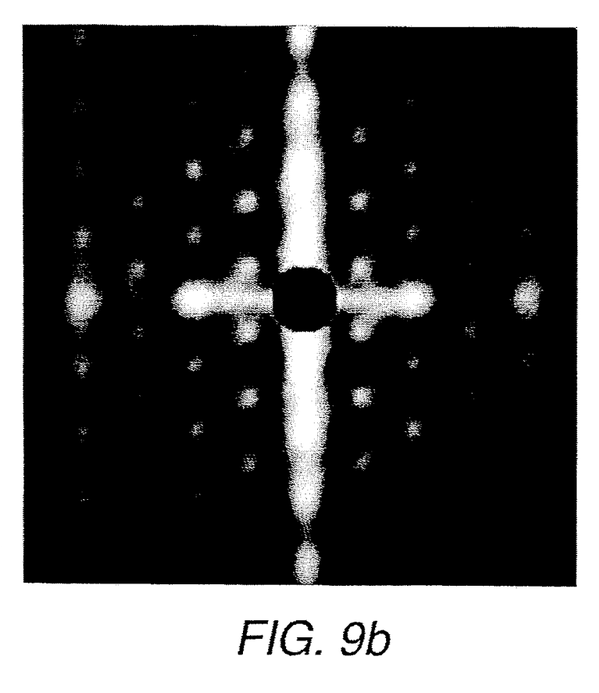

FIG. 2a shows a flood image having no artifacts except for random noise. FIGS. 3a, 4a, 5a, 6a, 7a, 8a show flood images having artifacts being: tube or hex pattern, secondary tube pattern, tramline (relatively brighter substantially parallel streaks), nonfunctional tube pattern (a darker or brighter patch), bright edge and general blotchiness, respectively. FIG. 9a has both tube pattern and tramline artifacts. Noise is also inherent in all these flood images.

Since noise is random and uncorrelated and the signal has correlation from one portion of the flood image to another, a correlation of one portion of the flood image with another portion of the flood image would cancel out random noise and result in information useful in exposing underlying defects within a flood image.

A correlation of an image with a shifted version of itself is an autocorrelation and involves taking a flood image of D dimensions and superimposing a shifted version of the same flood image on top of it. Portions of the shifted flood image that extend past the original flood image are wrapped around to the opposite side. A correlation is determined for all pixel intensity values in the flood images and the shied flood image is shifted again by a different value. This is performed for all possible shift values for D dimensions.. This results in a D dimensional correlation field.

When the flood images are superimposed with no shift in any dimension, the images line up exactly, producing a correlation of $I^2$ where $I^2$ is the sum of the squares of intensity values of pixels of the flood image. This corresponds to the zeroeth shift distances.

If the flood images have a border with pixels of constant value significantly different from the remainder of the image, the results would be influenced more by the difference between any pixel value of the image and the border values. The correlation field of an unnormalized image is influenced more by the shape of the image than its content.

Therefore, in order to key in on the differences within the image, and not the differences between the image and the border, the pixel values within the image must be normalized to have an average value equal to the constant border value.

Background Masking

Figure 10:
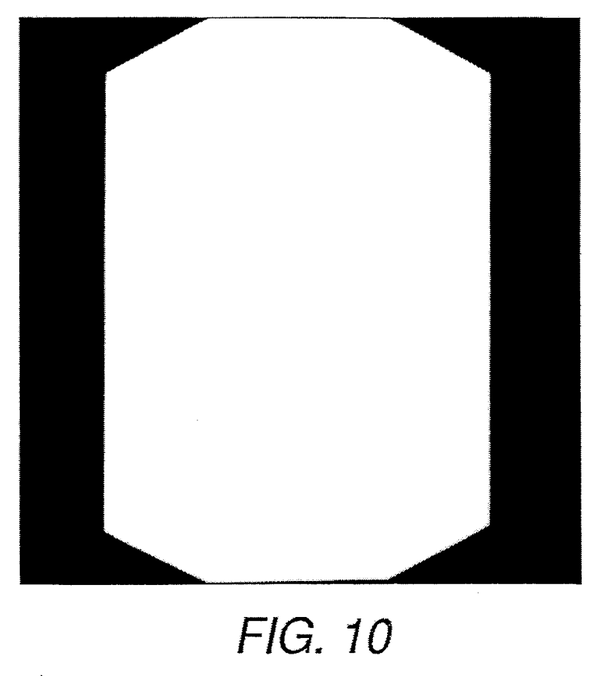
FIG. 10 is an region of interest (ROI) mask intended for deleting the background region outside of the region of interest of a Gamma camera.

Background masking causes the correlation field to contain information pertaining to the image inside the region of interest (ROI) instead of being dominated by the background region. Since the ROI of the image does not cover an entire flood image $A^{(0)}$, it is necessary to set the background values outside of the ROI to zero intensity creating a masked flood image $A^{(1)}$. FIG. 10 shows an ROI mask R having elements $R_{i,j}$ with black regions pertaining to a test mask element $R_{i,j}$ value of "0" and white regions pertaining to a test mask element $R_{i,j}$ value of "1", $$R_{i,j} = \begin{cases} 1; & \text{for } i,j \text{ within the } ROI \\ 0; & \text{for } i,j \text{ outside of the } ROI. \end{cases}$$

ROI mask R is specific to the field of view of imaging device. Other imaging devices take different shaped images, and hence require different ROI masks.

Image Intensity Normalization

Masked flood image $A^{(1)}$ is normalized to create a normalized flood image A having normalized pixel intensity values $A_{i,j}$ inside the ROI with an average pixel intensity value $\mu$ of 0. This is done by computing the average pixel intensity value $\mu$ of all pixel intensity values $A^{(1)}{}_{i,j}$ of masked flood image $A^{(1)}$ inside the ROI and subtracting $\mu$ from all pixel intensity values of masked flood image $A^{(1)}$.

$$A_{i,j} = \begin{cases} A^{(1)}_{i,j} - \mu; & \text{for } i,j \text{ within the } ROI \\ 0; & \text{for } i,j \text{ outside of the } ROI: \end{cases}$$

where A has $N \times N$ pixels intensity values $A_{i,j}$ at locations i,j, and $\mu$ is the average intensity value over flood image $A^{(1)}$, also referred to as "exposure".

Computation of the Correlation

The correlation field C(A) of normalized flood image A having N×N elements denoted $C(A)_{i,j}$ is defined as:

$$C(A)_{i,j} = \sum_{k=0}^{N-1} \sum_{l=0}^{N-1} A_{k,l} A_{k+i,l+j} \quad [1]$$

where the indices i,j wrap around the flood image A; in other words $A_{i,N+1}$ denotes the some pixel as $A_{i,1}$.

Since the correlation may involve N×N×N×N or $N^4$ computations, it is more efficient to compute the correlation using the Fourier transform according to the following formula:

$$C(A) = F^{-1}(|F(A)|^2) \quad [2]$$

where F(A) is the forward Fourier transform of the correlation field, and $F^{-1}$ (.) is the inverse Fourier transform. This method is described on pp. 195–196 of "Theory of Discrete and Continuous Fourier Analysis" by Joseph Weaver, A Wiley Inter-Science Publication (1989).

FIGS. 2b, 3b, 4b, 5b, 6b, 7b, 8b, and 9b show the correlation fields of FIGS. 2a, 3a, 4a, 5a, 6a, 7a, 8a and 9a, respectively. It can be seen that different types of artifacts present themselves in different regions of the correlation field.

The correlation field $C(A)_{i,j}$ is defined for i,j in the range [−N/2, N/2−1], where N×N is the size of the flood image. Thus, the origin, or the i=0, j=0 correlation value is at the center of the correlation field.

The correlation field contains a large spike at the origin, since $C(A)_{00}$ is equal to the sum of squares of the pixels in the flood image. Consequently, when viewing the correlation field it is advisable to mask out the origin so that the dynamic range may be chosen to make other features visible.

Analysis of the Correlation Field

The correlation field C(A) may be used by a human observer to aid in the diagnosis of image quality. However, for greatest benefit, a method of automatic analysis of the correlation field is needed to reduce subjectivity.

Different artifacts appear in different regions of the correlation field. Therefore the the total power in a specified region of correlation field C(A) is indicative of the presence of an artifact and may be compared with a specified threshold. If the power exceeds the specified threshold, then the flood image is deemed to have the artifact present and at a sufficient level. Various regions of correlation field C(A) are tested to determine the presence of various artifacts by masking out all portions of the correlation field except those that are to be tested with a test mask.

The following notation will be adhered to throughout the remainder of the specification:

$\sigma^2$ is the variance of the image over the region of interest, $\sigma$ is the standard deviation;

M is a test mask having elements $M_{i,j}$ equal to 1 or 0;

$$S_1(A,M) = \sum_{i=0}^{N-1} \sum_{j=0}^{N-1} C(A)_{i,j} M_{i,j}$$

is the sum of the correlation values of A over a test region;

$$S_2(A,M) = \sum_{i=0}^{N-1} \sum_{j=0}^{N-1} C(A)_{i,j}^2 M_{i,j},$$

is the sum of the squares of correlation values over a test region;

$v_1(A,M)$ is a first normalization factor depending on the test mask M used and the flood image tested; and $v_2(A,M)$ is a second normalization factor also depending on the test mask used and the flood image tested (the definitions of the first and second normalization factor will be described later).

Tests involving a Single Mask

Figure 11:
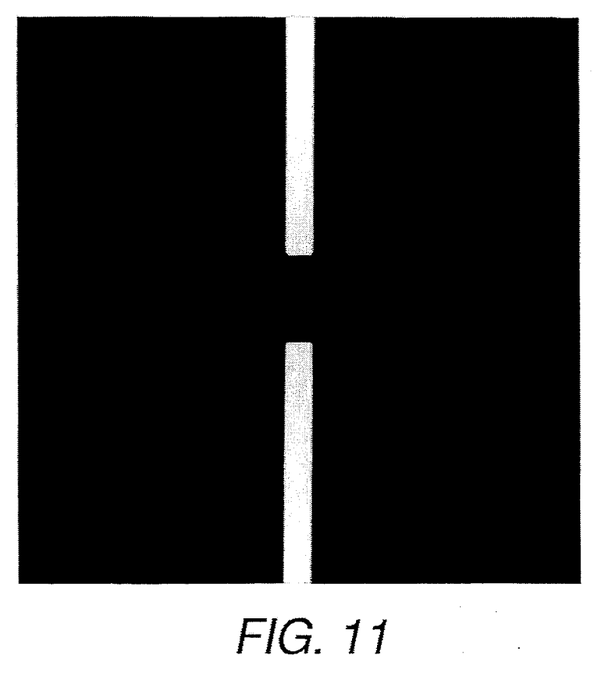
FIG. 11 is a test mask intended for testing for vertical tramline artifacts.

The first type of test involves a single mask. As an example, FIG. 11 shows a test mask called "maskv5". It consists of a vertical strip 5 pixels wide across the center of the image, except for a region near the center of the image (the i=0, j=0 term is masked out to increase dynamic range). The mask elements corresponding to a value "1" are shown in white and represent the region over which the correlation field C(A) is to be tested. Each mask is designed to test for a specific type of artifact, or several specific types of artifacts. In particular, for a test mask M and a correlation field C(A), the sums $S_1(A,M)$ and $S_2(A,M)$ are computed to calculate the power of the region tested. The calculated values are then multiplied by normalization factors $v_1(A,M)$ and $v_2(A,M)$.

The normalized sums are then compared against threshold values $T_1(M)$ and $T_2(M)$. Thus if $$v_1(A,M)S_1(A,M) > T_1(M) \quad [3]$$

or $$v_2(A,M)S_2(A,M) > T_2(M) \quad [4]$$

then the image is deemed to contain a significant artifact that is being tested for by test mask M. Appropriate action is then taken based upon the test results. This may be rejection of the imaging device during manufacturing, or automated adjustment in a lab environment. A variety of methods indicating the results of the test may be used, such as messages printed across a monitor, flashing lights etc.

Figure 5A:
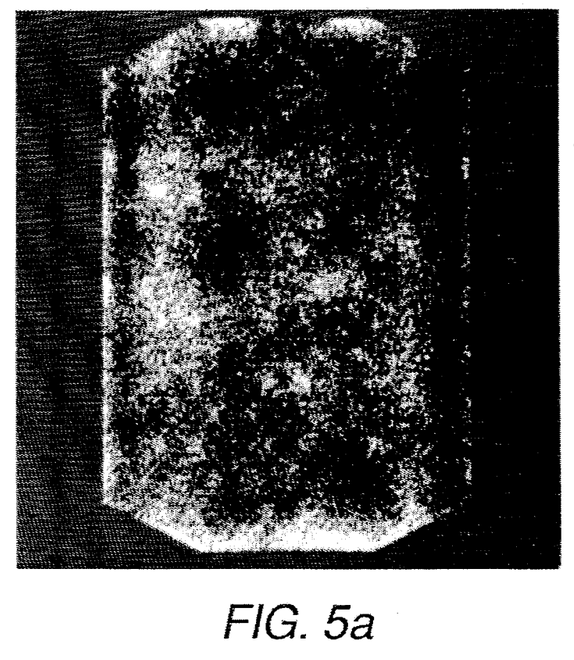
FIG. 5a is a flood image of a spatially constant source having tramline artifacts along with random noise.
Figure 5B:
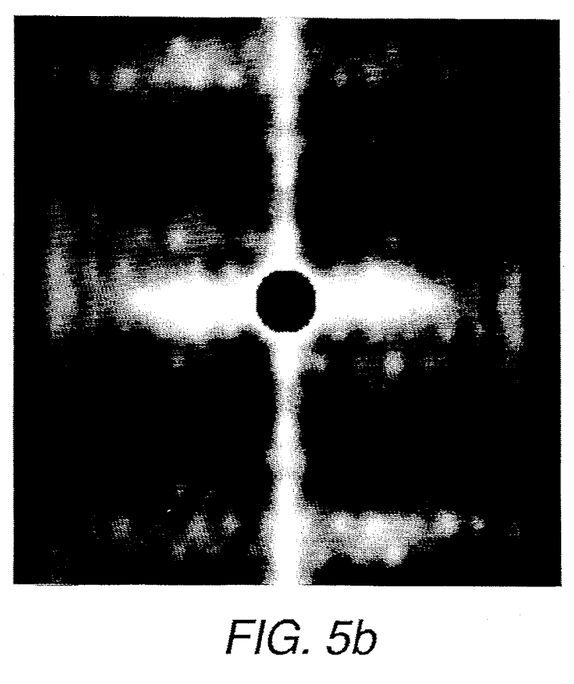
Figure 6A:
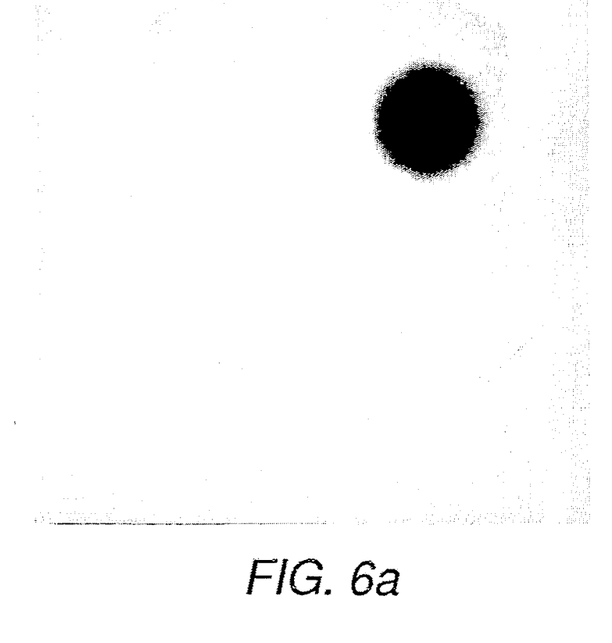
FIG. 6a is a flood image of a spatially constant source having non-functional tube pattern artifacts along with random noise.
Figure 6B:
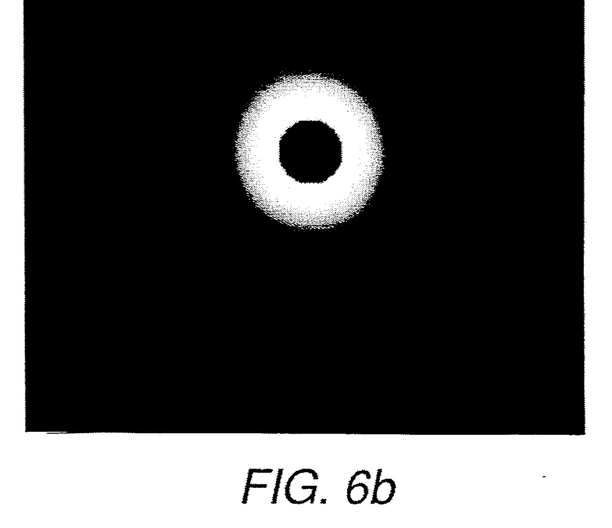
Figure 7A:
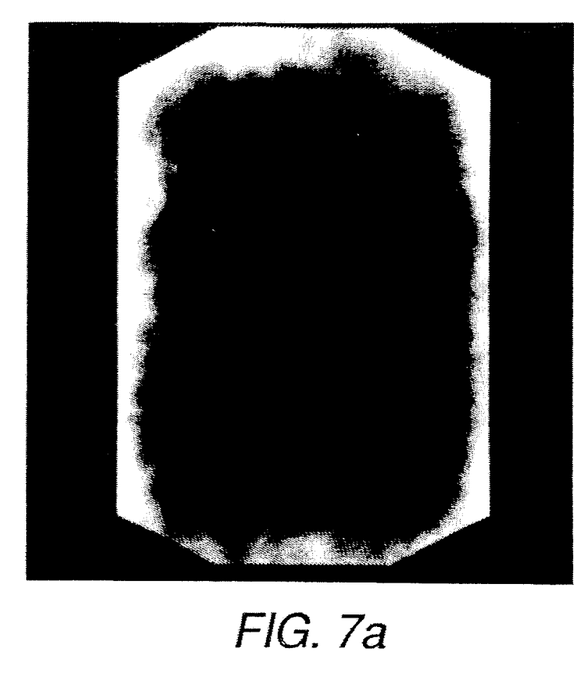
FIG. 7a is a flood image of a spatially constant source having bright edge artifacts along with random noise.
Figure 7B:
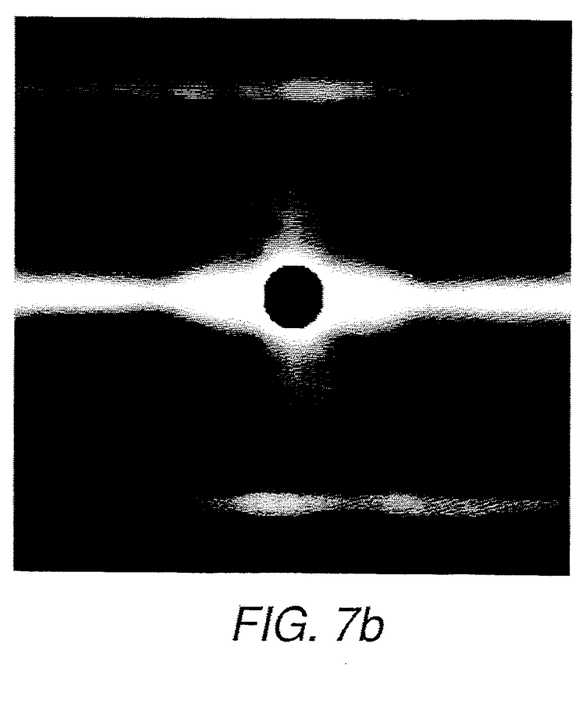
Figure 8A:
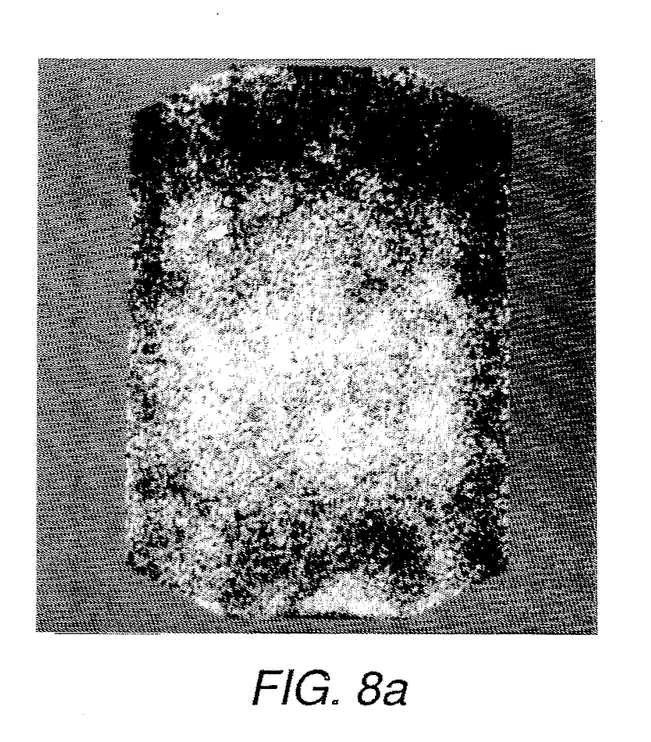
FIG. 8a is a flood image of a spatially constant source having general blotchiness artifacts along with random noise.
Figure 8B:
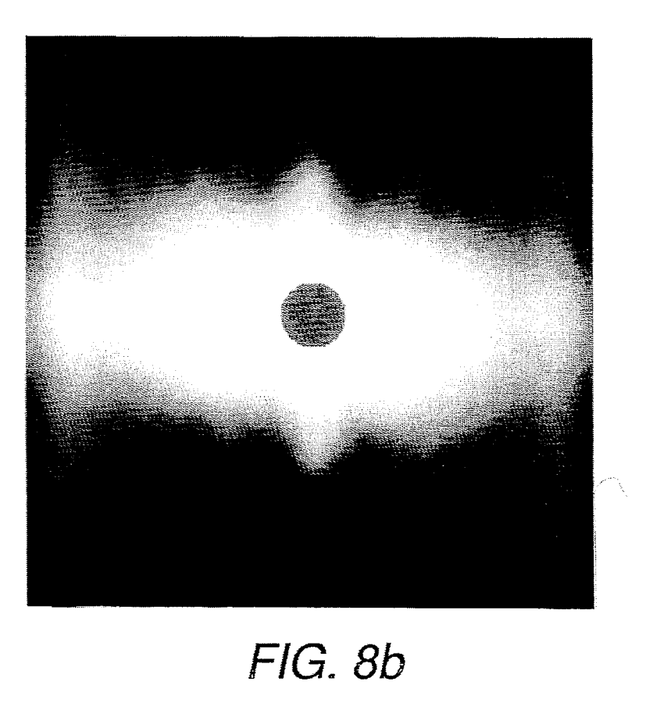

For instance, FIG. 5a shows the image containing tramlines. FIG. 5b shows the correlation field C(A) of FIG. 5a having brighter regions (larger correlation values) vertically and horizontally through the center of the correlation field. A test mask "maskv5" shown in FIG. 11, which tests for the occurrences of tramline artifacts, selects the vertical strip of the correlation field as a test region. If $$v_1(A,M)S_1(A,M) > T_1(M) \quad [5]$$

then the message such as "Vertical tram lines ? (narrow)" is displayed indicating the existence of tram lines in the image.

Similarly, if $$v_2(A,M)S_2(A,M) > T_2(M) \quad [6]$$

then a similar message is printed signaling the presence of "Vertical correlation" in the image.

Tests involving Two Mask

In a two-mask test, two test masks M and M' are used. The normalized sums $v_1(A,M)S_1(A,M)$ and $v_1(A,M')S_1(A,M')$ are computed, and if their difference exceeds a certain threshold $T(M, M')$ depending on both of the test masks, then the image is deemed to have failed the test.

Figure 3A:
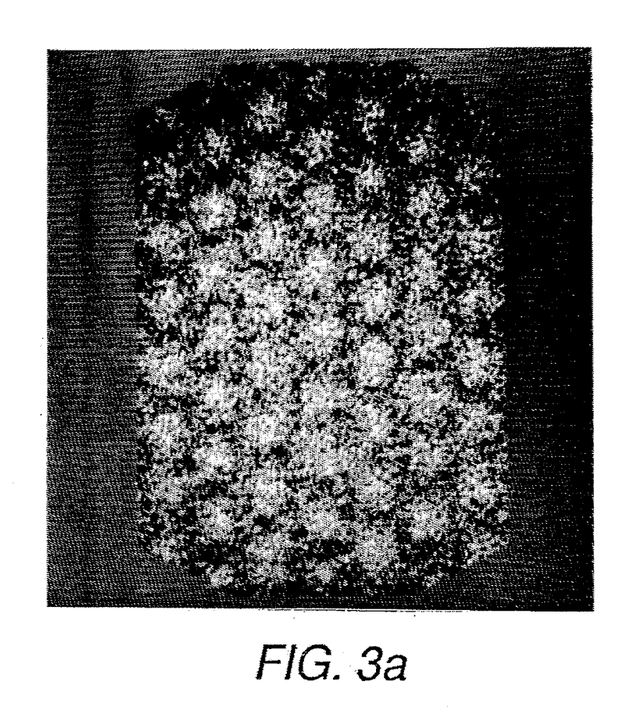
FIG. 3a is a flood image of a spatially constant source having "tube" or hex pattern artifacts along with random noise.
Figure 3B:
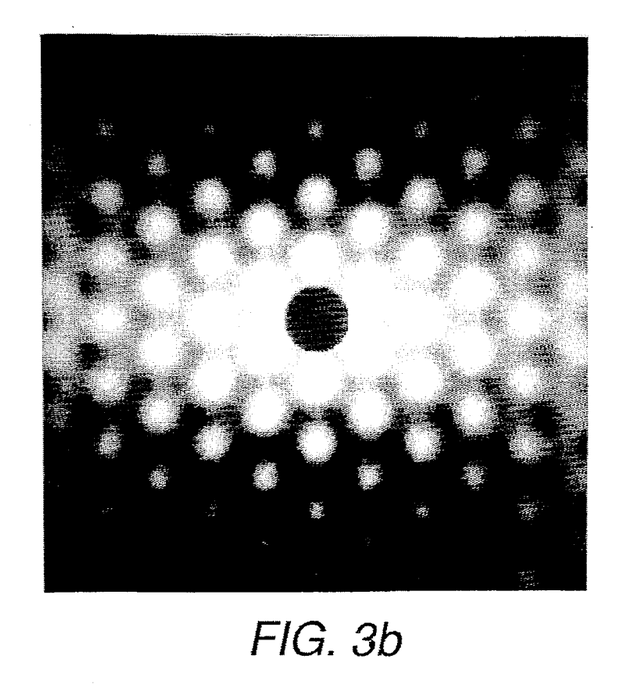
Figure 4A:
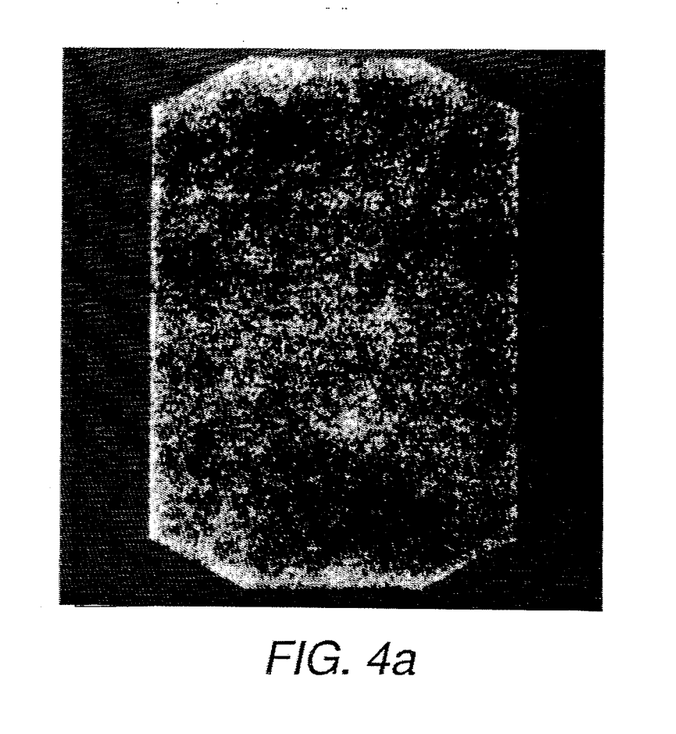
FIG. 4a is a flood image of a spatially constant source having secondary tube pattern artifacts along with random noise.
Figure 4B:
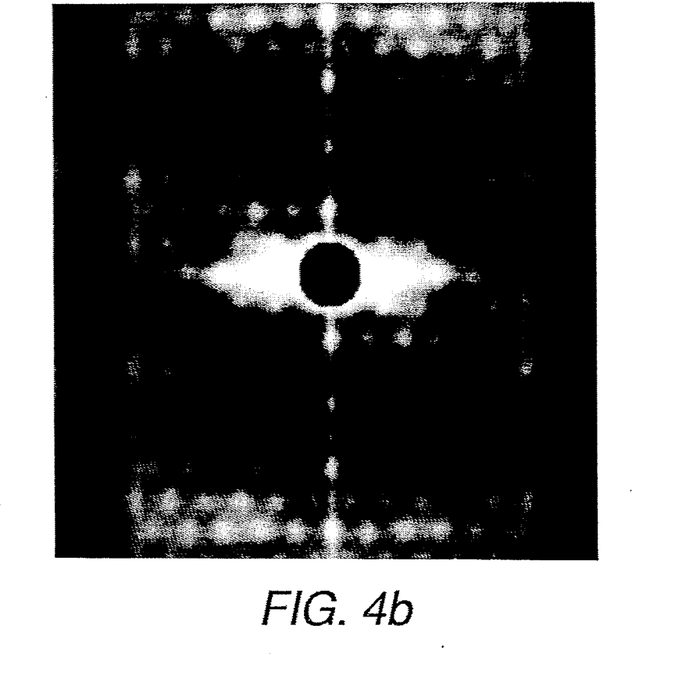
Figure 12:
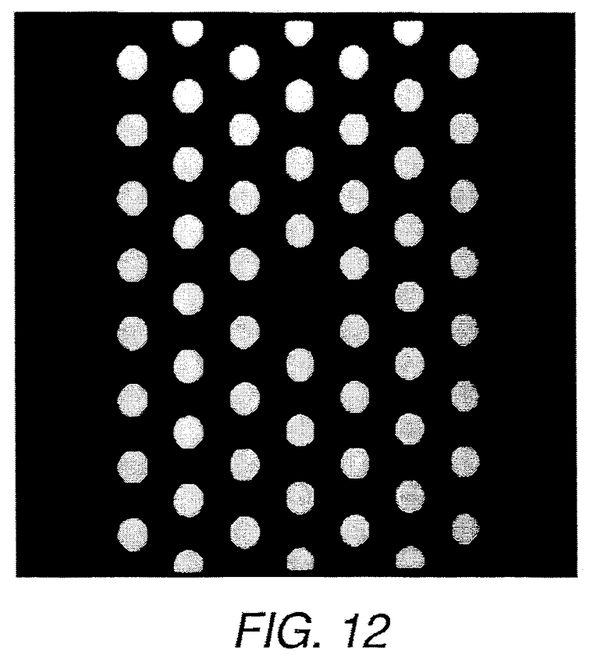
FIGS. 12 and 13 are two test masks "hex" and "hex-inv", respectively, intended to be used in a two mask test to detect the presence of hexagonal tube or "hex" patterns.
Figure 13:
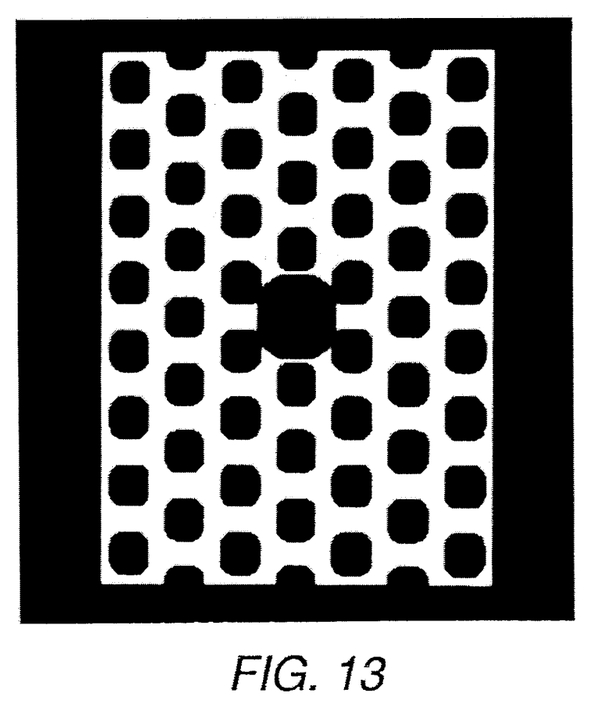

As an example, test masks "hex" and "hexinv" are used to detect the presence of hexagonal tube or "hex" patterns. The two test masks are shown in FIGS. 12 and 13, respectively. A hexagonal pattern is a common artifact found in Gamma camera images as seen in FIG. 3a and the correlation field FIG. 3b. The center to center spacing between bright or dark spots is related to the center-to-center spacing of photomultiplier tubes of the Gamma Camera. If one knows, a priori these distances, masks may be constructed. The mask "hex" of FIG. 12 indicates the expected positions of bright regions in the correlation field, whereas "hexinv" FIG. 13 indicates the expected position of dark regions. Setting M to be the mask "hex" and M' to be the mask "hexinv", the equation:

$$v_1(A,M)S_1(A,M) - v_1(A,M')S_1(A,M') > T(M,M') \quad [7]$$

is evaluated and if the threshold $T(M,M')$ is exceeded, then the image is deemed to have excessive hex or tube patterns and deemed to have failed this test.

Normalization by Mask Shape

It is desirable to have threshold values that are approximately independent of the size of the masks. For this reason, the raw summed correlation values are normalized by multiplying by certain normalization factors $v_1(A,M)$ and $v_2(A,M)$.

The sums $S_1(A,M)$ and $S_2(A,M)$ are obtained by summing $C(A)_{i,j}$ and $C(A)_{i,j}^2$ over the whole region represented by the mask M. However, C(A) is itself expressed as a sum $$C(A)_{i,j} = \sum_{k,l=0}^{N-1} A_{k,l} A_{k+i,l+j} \quad [8]$$

Therefore, the value of $S_1(A,M)$ or $S_2(A,M)$ is actually a sum of products of image values:

$$S_1(A,M) = \sum_{i,j} \sum_{k,l} A_{k,l} A_{k+i,l+j} M_{i,j} \quad [9]$$

The image A is, however masked by the ROI, so that its value is set to zero outside of ROI mask R. For this reason, the value of $S_1(A,M)$ or $S_2(A,M)$ is actually a sum of K products of image pixel values and ROI mask elements, where K is dependent on the number of non-zero mask elements $M_{i,j}$. Specifically, suppose that R is the ROI mask, $R_{i,j}=0$ or 1 so that the image A is set to be 0 wherever $R_{i,j}$ is zero. The number of non-zero terms in Eq. [9] is given by:

$$S_1(R,M) = \sum_{i,j} \sum_{k,l} R_{k,l} R_{k+i,l+j} M_{i,j} \quad [10]$$

This is equal to the sum over the masked region M of the correlation field, C(R) of the ROI with ROI mask R. The correlation, C(R) may be computed in advance and stored as an image in a file.

Therefore, $S_1(A,M)$ and $S_2(A,M)$ are normalized by dividing each by the number of non-zero mask elements $S_1(R, M)$ to obtain an average "per pixel" correlation.

Normalization by Mean Pixel Value and Mask Shape

In order for the images to be compared against specified thresholds, the summed correlation values must be normalized to be independent of the exposure $\mu$ of the image. If this is done, then the correlation threshold values will be valid for all image exposures.

The correlation of a signal increases as the square of the exposure, $\mu^2$. Consequently, the value of $S_1(A,M)$ increases proportional to $\mu^2$, whereas $S_2(A,M)$, which is a sum of squared correlation values, increases proportional to $\mu^4$.

Therefore, in order to correct for both mask shape and exposure, normalization factors $v_1(A,M)$ and $v_2(A,M)$ are:

$$v_1(A,M) = 1/S_1(R,M)\mu^2 \quad [11]$$

and $$v_2(A,M) = 1/S_1(R,M)\mu^4 \quad [12]$$

Hence, the normalized correlation values $\bar{S}_1(A,M)$ and $\bar{S}_2(A,M)$ are defined as follows:

$$\bar{S}_1(A,M) = v_1(A,M)S_1(A,M) = \frac{S_1(A,M)}{S_1(R,M)\mu^2} \quad [13]$$

$$\bar{S}_2(A,M) = v_2(A,M)S_2(A,M) = \frac{S_2(A,M)}{S_1(R,M)\mu^4} \quad [14]$$

It my be seen empirically that for a pure Poisson image, as the intensity increases, the normalized correlation values approach 0 and $1/\mu^2$ respectively:

$$\bar{S}_1(A,M) \approx 0 \quad [15]$$

$$\bar{S}_2(A,M) \approx 1/\mu^2 \quad [16]$$

For images with significant signal power, $$\bar{S}_1(A,M) \approx const \quad [17]$$

$$\bar{S}_2(A,M) \approx (const + 1/\mu)^2 \quad [18]$$

In practice, as long as $\mu$ is greater than about 10, then the values of $\bar{S}_1(A,M)$ and $\bar{S}_2(A,M)$ are essentially constant and may be compared with the threshold values to determine the quality of the image.

Selection of Threshold Values

An image is deemed to fail if its normalized correlation value with respect to a single or double mask tests exceeds a predetermined threshold value. The image passes only if it passes all the tests.

The selection of appropriate threshold values to determine image quality may be done empirically. A representative sample of images are examined by human observers and classified as good or bad. The normalized correlation values of the images with respect to a set of masks are then computed.

Thresholds are then chosen by hand or automatically in such a way that the pass/fail status of the image with respect to all tests agrees most closely with the classification of the human observer. This may be done (for instance) by choosing threshold values in such a way that all images rated as failing by a human observer are are deemed to fail by the threshold comparison test while as few good images as possible fail the test. This strategy may be termed a "no false positives—minimum false negative" strategy. The choice of thresholds is then a combination optimization problem, and may be solved by optimization techniques such as simulated annealing. The method of simulated annealing is described on pp. 1–20 of "The Annealing Algorithm" by R. H. J. M. Otten and L. P. P. van Ginneken, published by Kluwer Academic Publishers, Boston, 1989.

Another possible threshold selection strategy is "no false negatives—minimum false positive" strategy being the converse of the "no false positives—minimum false negative" strategy. The threshold values are chosen in such a way that all images rated as passing by a human observer are are deemed to pass by the threshold comparison while as few bad images as possible pass the threshold test.

Figure 14:
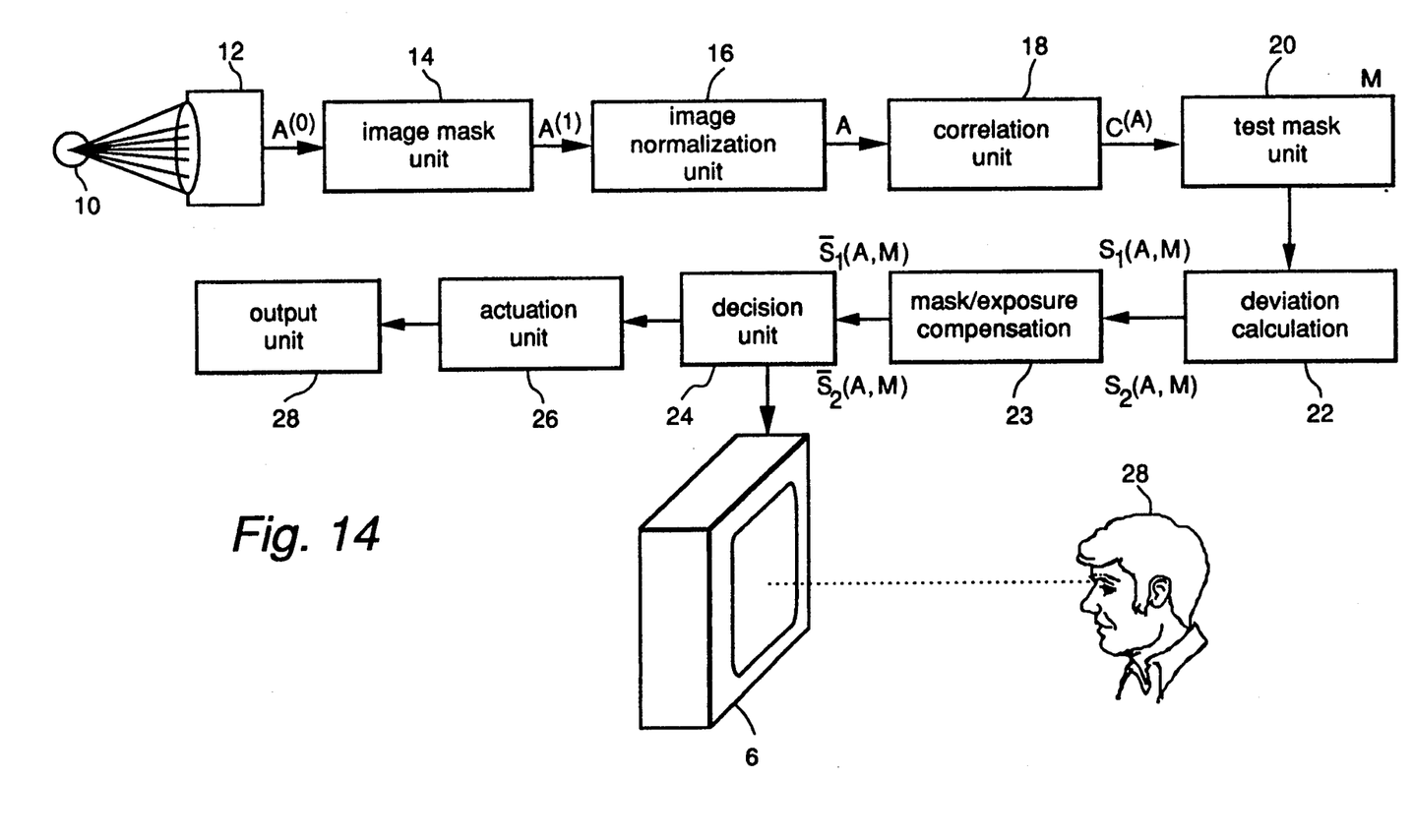
FIG. 14 is a simplified block diagram of an automated system for identifying defects in an imaging device according to the present invention.

FIG. 14 is a simplified block diagram of a system for identifying defects in an imaging device according to the present invention. A uniform source 10 provides radiation of spatially uniform intensity to an imaging device 12 allowing the imaging device to create a D-dimensional flood image $A^{(0)}$ comprised of a plurality of intensity values over a region of interest (ROI) and background region.

Flood image $A^{(0)}$ is passed to an ROI mask unit 14 adapted for setting values of the background region to zero and passing the remaining intensity values within ROI, being a flood image $A^{(1)}$, unchanged to an image normalization unit 16. Image normalization unit 16 calculates a mean intensity $\mu$ over the ROI and subtracts mean intensity $\mu$ from each intensity value within the ROI, resulting in a normalized intensity value of normalized flood image A having a mean intensity being zero over the ROI.

A correlation unit 18 coupled to the ROI mask unit 14 receives the normalized intensity values A and determines a D-dimensional correlation field C(A). A test mask 20 selects regions of the correlation field to be tested according to a test mask M and passes the selected regions of correlation field C(A) to a deviation calculation unit 22 which determines a sum of correlation values $S_1(A,M)$ and a sum of the squares of the correlation values $S_2(A,M)$ within the selected regions. A mask/exposure compensation unit 23 receives correlation values $S_1(A,M)$ and $S_2(A,M)$ and determines a universal correlation sum $\bar{S}_1(A,M)$ and a universal squared correlation sum $\bar{S}_2(A,M)$ both normalized for the test mask M employed and the exposure $\mu$ of the original flood image $A^{(0)}$.

A decision unit 24 coupled to mask/exposure compensation unit 23 compares normalized correlation sum $\bar{S}_1(A,M)$ and normalized correlation squared sum $\bar{S}_2(A,M)$ to corresponding predetermined maxima threshold values and determines if each thresholds has been exceeded. If at least one threshold has been exceeded, decision unit 24 may take an appropriate action such as activating an actuation unit 26 to operate an output means 28 or displaying a message on a display means 24, which indicates that at least one of the threshold values have been exceeded.

In alternative embodiments, the actuator means 26 may physically remove an imaging means that fails the tests from an assembly line, print and attach a tag indicating that the imaging device has failed the test, or iteratively adjust equipment in the imaging means to reduce the artifact and repeat the test.

Therefore, a summary of a method consistent with the present invention are the steps of:
1. selecting an imaging device to be tested;
2. creating a region of interest (ROI) mask R for the selected imaging device;
3. selecting types of artifacts to be detected;
4. creating a test mask M for each type of artifact;
5. creating a flood image $A^{(0)}$ with the selected imaging device to be tested having a plurality of intensity values each corresponding to a pixel of the flood image;
6. masking out regions of the flood image $A^{(0)}$ with ROI mask R to select the ROI and produce a flood image $A^{(1)}$;
7. determining an average exposure $\mu$ over the ROI of flood image $A^{(1)}$;
8. normalizing flood image $A^{(1)}$ by subtracting $\mu$ from each pixel value to produce normalized flood image A;
9. performing an autocorrelation of normalized flood image A to provide a plurality of correlation values comprising a correlation field C(A);
10. masking out regions of correlation field C(A) with the test mask M to result in tested regions of the correlation field;
11. determining a correlation sum $S_1(A,M)$ and a correlation squared sum $S_2(A,M)$ within the tested regions of the correlation field;
12. normalizing the correlation sum $S_1(A,M)$ and the correlation squared sum $S_2(A,M)$ in the test regions for both test mask shape and average exposure $\mu$ to arrive at a normalized correlation sum $\bar{S}_1(A,M)$ and a normalized correlation squared sum $\bar{S}_2(A,M)$ respectively;
13. comparing the normalized sum of the correlation values $\bar{S}_1(A,M)$ and the sum of the squares of the correlation values squared $\bar{S}_2(A,M)$ against a first and second threshold, respectively; and
14. taking an appropriate action when at least one of the thresholds has been exceeded indicating that an artifact of the type being tested for is present in the image of the imaging device to a degree greater than the acceptable threshold; and
15. repeating steps "5"–"14" for all artifact types to be tested.

The ROI mask is constructed to pass pixels which are within the field of view of the imaging device, and blocks all other regions of the flood image.

The test mask is constructed using a known artifact and examining the correlation field pattern produced. This may be summarized for each test mask as:
1. creating a flood image $A^{(0)}$ having a known artifact type which is desired to be tested for in other flood images;
2. masking out regions of flood image $A^{(0)}$ with the ROI mask to select the ROI and produce a flood image $A^{(1)}$;
3. determining an average exposure $\mu$ over flood image $A^{(1)}$;
4. normalizing flood image $A^{(1)}$ by subtracting exposure $\mu$ from each pixel value to produce a flood image A;
5. performing an autocorrelation of flood image A to provide a plurality of correlation values comprising a correlation field C(A);
6. determining characteristic regions of the correlation field; and 7. creating a test mask which selects the characteristic regions and blocks other regions of the correlation field.

While several presently preferred embodiments of the invention have been described in detail herein, many modifications and variations will now become apparent to those skilled in the art. It is, therefore, to be understood that the appended claims are intended to cover all such modifications and variations as fall within the true spirit of the invention.

What is claimed is:

1. An automated system for identifying and compensating for defects in an imaging device comprising:
  a) a radiation source for providing radiation of spatially uniform intensity to said imaging device to allow said device to create a D-dimensional image ($A^{(0)}$) comprised of a plurality of intensity values over a region of interest (ROI) within a field of view of said imaging device and a background region outside the field of view of said imaging device;
  b) a region of interest (ROI) mask unit for receiving the image $A^{(0)}$ and for employing a mask R setting values of the background region of image ($A^{(0)}$) to zero while leaving the intensity values of the ROI unaffected thereby producing a flood image ($A^{(1)}$);
  c) image normalization unit coupled to the ROI mask unit for calculating a means intensity ($\mu$) over flood image ($A^{(1)}$) and subtracting the means intensity ($\mu$) from each intensity value of flood image ($A^{(1)}$) so as to result in a normalized flood image A having intensity values with a means intensity ($\mu$) of zero over the ROI;
  d) a correlation unit for receiving the normalized intensity values of normalized flood image (A) from the image normalization unit and determining a D-dimensional correlation field C(A);
  e) test mask unit coupled to the correlation unit for employing a test mask (M) that blocks out non-desired regions of the correlation field C(A) and selected desired regions of the correlation field;
  f) deviation calculation unit coupled to the correlation unit for determining a correlation sum $S_1(A,M)$, and a correlation squared sum $S_2(A,M)$ being a sum of the correlation values and a sum of the squares of the correlation values, respectively, for the selected regions of correlation field C(A);
  g) decision unit adapted for comparing the correlation value sum $S_1(A,M)$ and the correlation squared sum $S_2(A,M)$ produced by the deviation calculation unit to predetermined maximum thresholds, for determining if any of the thresholds have been exceeded; and
  h) unit for indicating if either of said thresholds has been exceeded; and
  i) an actuation unit responsive to the decision unit for adjusting the imaging device accordingly when at least one of the predetermined thresholds has been exceeded.

2. The automated system for identifying and compensating for defects in an imaging device as recited in claim 1 wherein the decision unit is adapted to perform a plurality of subtests by comparing each correlation sum $S_1(A,M)$ and correlation square sum $S_2(A,M)$ produced by the deviation calculation unit to corresponding predetermined maxima threshold values.

3. The automated system for identifying and compensating for defects in an imaging device as recited in claim 1 and further comprising a mask/exposure compensation unit for receiving each correlation sum $S_1(A,M)$ and each correlation square sum $S_2(A,M)$ from the deviation calculation unit and adjusting said sums to compensate for the test mask (M) employed and the means intensity $\mu$ of the original flood image ($A^{(0)}$) according to:

$$\bar{S}_1(A,M) = \frac{S_1(A,M)}{S_1(R,M)\mu^2}$$

and $$\bar{S}_2(A,M) = \frac{S_2(A,M)}{S_1(R,M)\mu^4}$$

$$S_1(R,M) = \sum_{i,j} \sum_{k,l} R_{k,l} R_{k+i,l+j} M_{i,j}$$

where, $$R_{i,j} = \begin{cases} 1 \text{ for } i,j \text{ within a region of interest } (ROI) \\ 0 \text{ for } i,j \text{ outside of the } ROI \end{cases}$$

and $M_{i,j}$ is an ijth test mask element being either 0 or 1, and for providing the adjusted sums to the decision unit.

4. An automated method of testing an imaging device for artifacts and adjusting the imaging device comprising the steps of:
  a) creating a region of interest (ROI) mask R which corresponds to a field of view of said imaging device;
  b) selecting types of artifacts to be detected;
  c) creating a test mask (M) for each type of artifact;
  d) irradiating the imaging device to be tested, with spatially uniform electromagnetic radiation from a radiation source thereby causing the imaging device to create a flood image ($A^{(0)}$) having a plurality of intensity values each of said values corresponding to a respective pixel of the flood image ($A^{(0)}$);
  e) acquiring the flood image ($A^{(0)}$) from said imaging device;
  f) masking out regions of the flood image ($A^{(0)}$) with ROI mask R to select the ROI, the resulting selected regions being a masked flood image ($A^{(1)}$);
  g) determining an average exposure ($\mu$) over the ROI of flood image ($A^{(1)}$);
  h) normalizing flood image ($A^{(1)}$) by subtracting ($\mu$) from each intensity value of masked flood image ($A^{(1)}$) to arrive at a normalized flood image (A);
  i) performing an autocorrelation of normalized flood image (A) to provide a plurality of correlation values comprising a correlation field C(A);
  j) masking out regions of correlation field C(A) with the test mask (M) to leave remaining only tested regions of the correlation field;
  k) determining a correlation sum $S_1(A,M)$ and a correlation squared sum $S_2(A,M)$ within the tested regions of the correlation field;
  l) normalizing the sum of the correlation values $S_1(A,M)$ and the sum of the squares of the correlation values squared $S_2(A,M)$ in the test regions for both test mask shape and average exposure $\mu$ to arrive at a normalized correlation sum $\bar{S}_1(A,M)$ and a normalized correlation squared sum $\bar{S}_2(A,M)$ respectively;
  m) comparing the normalized correlation sum $\bar{S}_1(A,M)$ and normalized correlation squared sum $\bar{S}_2(A,M)$ against a first and second threshold, respectively;
  n) if at least one of the thresholds has been exceeded, indicating that an artifact of the type being tested for is present in the image of the imaging device to an unacceptable degree then:
1. adjusting said imaging device using an actuation unit,
2. retesting the imaging device for artifacts by repeating steps "d"–"m" until a satisfactory artifact level is achieved ro until the imaging device is rejected; and o) repeating steps "d"–"n" for all artifact types to be detected.

5. The automated method of testing an imaging device and adjusting the imaging device as recited in claim 4 wherein the step of creating a test mask comprises the steps of:

a) creating a flood image ($A^{(0)}$) having a known artifact type which is desired to be tested for in flood images;

b) masking out regions of the flood image ($A^{(0)}$) with the ROI mask to select the ROI and produce a masked flood image ($A^{(1)}$);

c) determining an average exposure $\mu$ of the masked flood image ($A^{(1)}$) over the ROI;

d) normalizing masked flood image ($A^{(1)}$) by subtracting average exposure ($\mu$) from each intensity value of masked flood image ($A^{(1)}$) to arrive at a normalized flood image (A);

e) performing an autocorrelation of normalized flood image (A) to provide a plurality of correlation values comprising a correlation field C(A);

f) determining characteristic regions of the correlation field C(A);

g) creating a test mask (M) which selected the characteristic regions and blocks other regions of the correlation field; and h) repeating steps "a"–"g" for each test mask (M) to be constructed.

* * * * *